United States Patent [19]
Rosenberg

[11] Patent Number: 5,234,581
[45] Date of Patent: Aug. 10, 1993

[54] WET/DRY FILTRATION SYSTEM UTILIZING MECHANICAL, BIOLOGICAL AND CHEMICAL MEANS

[76] Inventor: Richard Rosenberg, 1101 Midland Ave., Bronxville, N.Y. 10708

[21] Appl. No.: 796,769

[22] Filed: Nov. 25, 1991

[51] Int. Cl.$^5$ .............................................. A01K 63/04
[52] U.S. Cl. ................................... 210/151; 210/169; 210/416.2; 119/26; 119/261
[58] Field of Search ............ 210/150, 151, 169, 416.2; 119/5

[56] References Cited

U.S. PATENT DOCUMENTS

| | | | |
|---|---|---|---|
| 3,199,678 | 8/1965 | Willinger | 119/5 |
| 3,490,416 | 1/1970 | Kelly et al. | 210/169 |
| 3,965,007 | 6/1976 | Conn et al. | 210/169 |
| 3,994,811 | 11/1976 | Cohen et al. | 210/169 |
| 4,025,431 | 5/1977 | Saxton | 210/169 |
| 4,033,719 | 7/1977 | Conn et al. | 210/169 |
| 4,076,619 | 2/1978 | Howery | 210/169 |
| 4,863,594 | 9/1989 | Pedretti | 210/169 |
| 5,108,594 | 4/1992 | Giovanetti et al. | 210/169 |

OTHER PUBLICATIONS

The Marine Aquarium Reference by Martin A. Moe Jr. pp. 178-187 (1982).

Primary Examiner—Stanley S. Silverman
Assistant Examiner—Robert James Popovics
Attorney, Agent, or Firm—Lieberman & Nowak

[57] ABSTRACT

An undergravel wet/dry trickle system utilizing mechanical, biological and chemical filtration is described. This system provides the advantage of compact size coupled with efficient purification and saturation level oxygenation of the water returned to the aquarium. Moreover, this invention relies on a simple manufacture which is less costly than any wet/dry trickle system previously known.

17 Claims, 4 Drawing Sheets

WET/DRY FILTRATION SYSTEM UTILIZING MECHANICAL, BIOLOGICAL AND CHEMICAL MEANS

BACKGROUND OF THE INVENTION

The subject invention is an undergravel wet/dry trickle filter system having advantages over known systems. It is mounted inside an aquarium, eliminates the need for hoses and noisy motors that can leak and cause damage, is less expensive to manufacture than conventional wet/dry filter systems, and is considerably quieter than conventional systems.

Undergravel filtration systems are well known in the art. For example, Byrne, et al., U.S. Pat. No. 4,817,561, issued Apr. 4, 1989, describe an aeration and filtering system for use in an aquarium which utilizes a porous filter bed that is spaced above the tank bottom with a pumping means located in a chamber below the filter bed. This filter, as well as other undergravel filters, uses aerobic bacteria in the gravel to destroy wastes and secretions. In contrast, the subject invention does not use gravel as a bacterial bed. This provides the advantage of maintaining the gravel in a pristine condition.

External biological aquarium filters are also known in the prior art. For example, Willinger, U.S. Pat. No. 4,265,751, issued May 5, 1991, describes an external aquarium filter utilizing a filter bed of open cell reticulated foam plastic material, such as polyurethane foam and a layer of activated carbon. Unfortunately, disadvantages of the Willinger system include the need to back flush the filter to remove accumulated sediment. The subject invention, on the other hand, utilizes a sponge to trap particulates, thereby overcoming a problem found in prior art undergravel filters.

The use of oxidation of a means for purifying, sterilizing and clarifying water is known. Bullock, U.S. Pat. No. 4,874,509, issued Oct. 17, 1989, describes such a system for use in a swimming pool. Although such systems have not been typically employed in aquariums, the advantages taught by Bullock have been incorporated into the subject filtration system.

Biological, mechanical and chemical adsorption elements have been described in external aquarium filtration means. Orensten, et al., U.S. Pat. No. 3,957,634, issued May 18, 1976, describe such a filtration system. Although this filtration means and method accomplish similar end results as the subject invention, the Orensten, et al. system costs substantially more than the subject apparatus and is not contained within the aquarium. Hall, U.S. Pat. No. 4,268,387, issued May 19, 1981, describes a highly complicated filtration system utilizing a plurality of levels for conducting filtration. Although this patent discusses biologically clean and chemically clean undergravel systems, the system described is not a flow through system and does not include the benefits of a highly oxidized bed.

A major cause of system breakdown in a conventional wet/dry filter is water evaporation that causes the sump to go dry, stopping circulation and frequently burning out the sump pump motor unless expensive electronic sump control devices are installed. In addition, if the siphon to the filter stops for any reason, water from the sump will continue to be pumped into the tank causing it to overflow onto the floor. On the other hand, if motor failure occurs, the siphon will drain the aquarium and water will overflow from the filter. Because of these problems, taking a vacation requires someone trained in maintaining proper water levels to come daily to your home/office. The only alternative to hiring help was to purchase an expensive system to cap the sump level, requiring installation of water lines from a sink or house plumbing to the aquarium. However, even with such a system, ballcock shut off failure can result in serious flood damage. In contrast, the subject filter system can operate until most of the water in the tank has evaporated.

Accordingly, the subject invention provides a solution to the long felt need for a wet/dry filter system which does not require manned supervision or expensive mechanical water level maintenance. The subject system is self-contained and comprises mechanical, biological, chemical (additives and absorbing), reactive systems that leave water more purified than former systems, while requiring fewer water changes and less maintenance. Further, unlike conventional wet/dry systems, it is unnecessary to prime siphons after changing water, since the filter is contained below the water level, even during water changes.

The subject system, therefore, represents a major breakthrough in aquarium filtration. It is extremely small, powerful, inexpensive to manufacture, requires no knowledge on the part of the user (just put the filter into the tank, cover it with gravel and connect the air pump to the filter), works automatically and requires no costly equipment or metering devices. Moreover, the subject system provides a combined oxygen reactor chamber and bacterial chamber. This novel concept maximizes bacterial bed effectiveness, while saturating the water with oxygen which oxidizes chemicals not acted upon by the aerobic bacteria together with by-products of bacterial decomposition.

SUMMARY OF THE INVENTION

A wet/dry filtration system is provided for use within an aquarium. The system comprises a sealed housing having a water input opening and a water output opening, a chamber in communication with the water input opening at one end and the water output opening at the other end, the chamber being configured so as to provide a surface suitable for bacterial growth, means for introducing oxygen to the chamber, and means for inducing a flow of water from the water input opening to the water output opening.

The sealed housing is preferably made of a plastic. Any nontoxic plastic may be employed with the choice of plastic being obvious to one skilled in the art. Such plastics include, but are not limited to polypropylene polyethylene polyurethane, acrylic, polyethylene terephthalate (PET) and polycarbonate. It is also preferred that the filtration system further comprise a particulate filter at the water input opening. Typically, the particulate filter comprises a sponge that is enclosed within a porous material, such as a netting. The netting comprises means for facilitating removal of the sponge and may have a loop attached which allows the sponge to be hooked and removed for cleaning or replacement. This provides the advantage of not requiring the user to place his hands in the tank (human skin contains many substances which are detrimental to aquatic life, such as soaps, oils, perfumes and bacteria).

The chamber typically comprises a plurality of interior surfaces and preferably uses high surface area bacteria compatible supports, such as a plurality of bio balls located within the chamber. Bio balls have a large surface area which does not significantly retard the flow of water through the chamber or clog due to lodged particulate matter. Other suitable bacterial supports include, but are not limited to, porous ceramic particles, open-cell sponges, and double layered surface (DLS TM).

Means for introducing oxygen to the chamber normally comprises a tube which enters the chamber at the end in communication with the water input opening. The opposite end of the tube is normally connected to a source of pressurized oxygen containing gas, such as an air pump. The choice of air pump is readily determinable to one skilled in the art and includes, but is not limited to, vibrator pumps and piston pumps.

Means for inducing a flow of water from the water input opening to the water output opening typically comprises a gaslift tube which is sealingly connected to the water output opening. The gaslift tube usually includes means for introducing a gas to a position below the waterline in an aquarium. The force of the gas bubbling through the water causes a flow of water from the water output opening through the gaslift tube and into the aquarium. In one preferred embodiment, the gaslift tube further comprises a fitting at the end opposite the end connected to the water output opening for returning water to the aquarium. This fitting is adapted to accept one or more attachments suitable for contacting the water exiting the fitting with a selected substance. Such substances can, among other things, further purify water or treat the water exiting the fitting. Purifying substances include, but are not limited to, activated carbon, ammonia absorbers, nitrite absorbers, phosphate absorbers, nitrate absorbers and resins, treating substances include, but are not limited to, vitamins, amino acids, lipids, carbohydrate and medications.

Independent of the water treatment attachments, an attachment may also be a protein skimmer. A protein skimmer typically comprises a tube that contacts the water in the fitting under conditions such that bubbles present in the fitting rise through the tube and burst within a container that encloses the top of the tube thereby depositing proteinaceous material within the container. An example of a similar protein skimmer is described by Cohen, et al., U.S. Pat. No. 3,994,811, issued Nov. 30, 1976, which is hereby incorporated by reference.

A preferred example of the subject wet/dry filtration system for use within an aquarium includes a sealed housing having a water input opening and a water output opening, a particulate filter contained within the housing at the input opening (the particulate filter being in contact with the input opening and in communication with the interior of the housing), a first chamber located below the particulate filter (water passing through the input opening and the particulate filter enters the first chamber and builds back pressure), a drip plate having a plurality of openings (the drip plate being at a position suitable to allow waste to exit the first chamber), a second chamber located adjacent to the drip plate (water passing through the drip plate enters the second chamber which has a plurality of bioballs located therein), means for introducing oxygen to the second chamber, a sump located below the second chamber (so that water exiting the second chamber enters the sump), and a gaslift tube having a first end proximate to the bottom of the sump and a second end above the housing (the gaslift tube is sealingly connected to and transversing the water output opening and has a means for dispensing gas at a point below the second end so that the force of the gas rising within the gaslift tube generates a flow of water through the filter system).

DETAILED DESCRIPTION OF THE INVENTION

Figure 1:
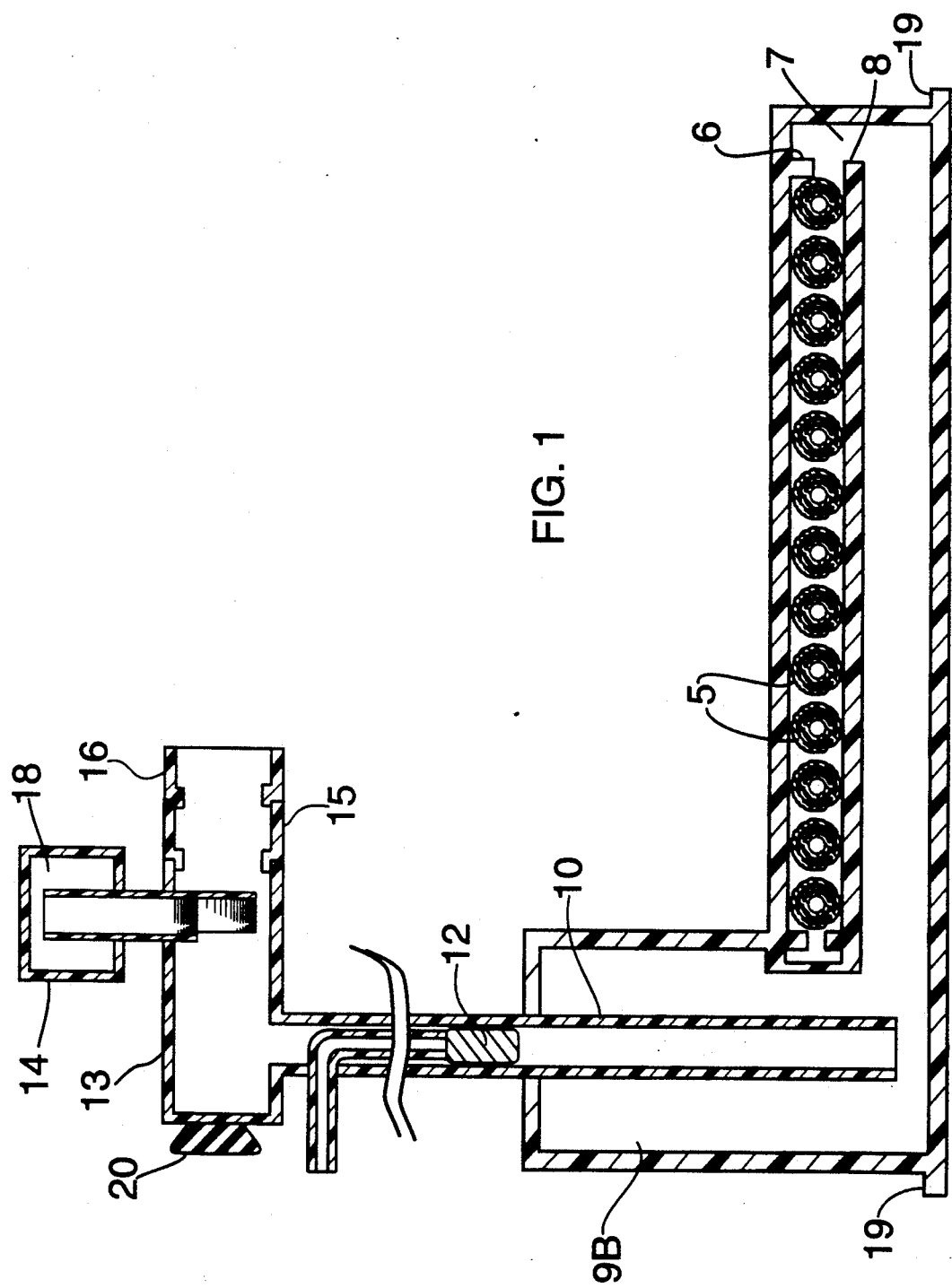
FIG. 1—A cross-sectional view of the subject wet/dry filtration system taken through a gaslift tube.

The subject invention will now be described in terms of its preferred embodiment. A preferred embodiment of the subject invention is an internal aquarium filtration system encompassing a sealed wet/dry undergravel trickle filter system that prevents flooding of the wet/dry chamber and controls water intake through a mechanical filter that traps particulate matter suspended in aquarium water. Water then enters a second chamber through the mechanical filter. This builds back pressure within the second chamber, forcing water through a drip plate which separates the biological chamber from the intake chamber. The flow of water transversing the holes in the drip plate can be regulated by varying the hole size and/or by controlling the air pressure introduced by an external air pump into the wet/dry chamber.

Water passing through the drip plate is combined with pressurized air in the biological chamber which also serves as an oxygen reactor chamber. The concept of using oxygen to clean water is described in U.S. Pat. No. 4,874,509, and the workings of a biological chamber are described in U.S. Pat. No. 4,265,751, the contents of both are herein incorporated by reference. Oxygen rich water thus produced is forced by pressure through the bacteria bed while maintaining the wet/dry environment. The oxygen rich environment permits a larger bacteria bed to be sustained than in conventional external wet/dry filters and functions to oxidize pollutants in the water (due, among other things, to poor quality tap water and byproducts of the biological system), allowing biological and chemical filtration to take place in this chamber. Excess saturated oxygen in the filter boosts the oxygen level of the aquarium to saturation levels and maintains the health of life in the aquarium.

Water trickling into the wet/dry chamber flows across a plate having an entry to a "pump" which returns water to the tank by means of one or more air lift tubes. The returned water circulates throughout the tank, and eventually back to the filter to complete the cycle. The airlift tubes also provide a further means for oxygenating the aquarium water.

A fitting may be present at the top of the airlift tubes to accept one or more adapters at the point where water outputs the system. An adapter may contain chemical materials to absorb any impurities in the water not removed by mechanical, biological or oxidizing means. Examples of such chemical materials include, but are not limited to, activated carbon, ammonia absorbers, nitrite, phosphate and nitrate resins. An adapter may also contain additives such as vitamins, amino acids, lipids, medications or beneficial bacteria which are used by the aquarium life to improve their health. In a marine environment, a fitting at the top of the airlift tube allows a protein skimmer adapter to be employed for removing proteinaceous compounds from the water.

Airlift tubes may be fed with ozone to purify the water by raising the redox level of the water. A carbon adapter may also be added to absorb excess ozone, preventing it from entering the tank and harming the life or bacterial bed.

Figure 2:
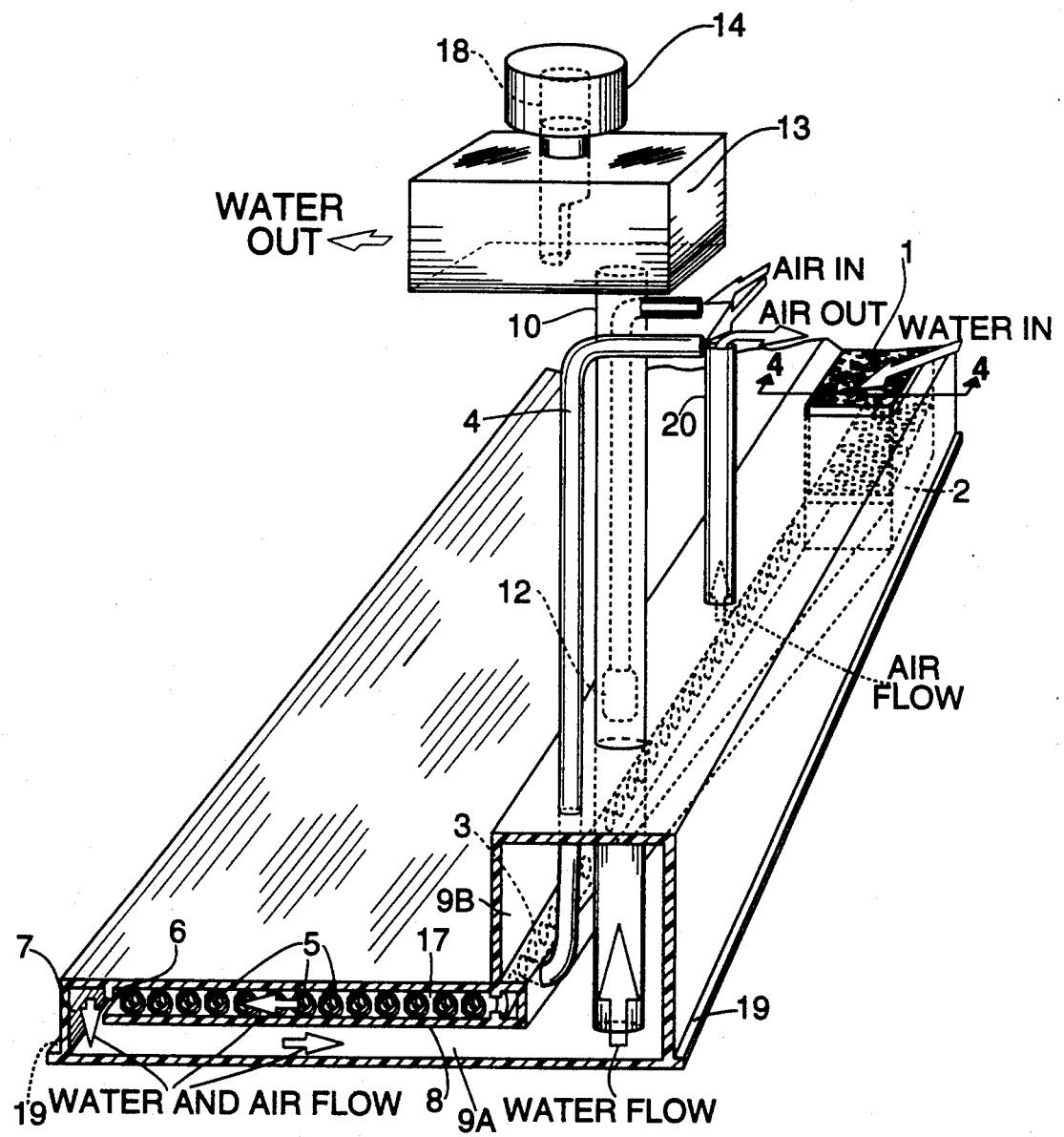
FIG. 2—A perspective view of the subject wet/dry filtration system.
Figure 3:
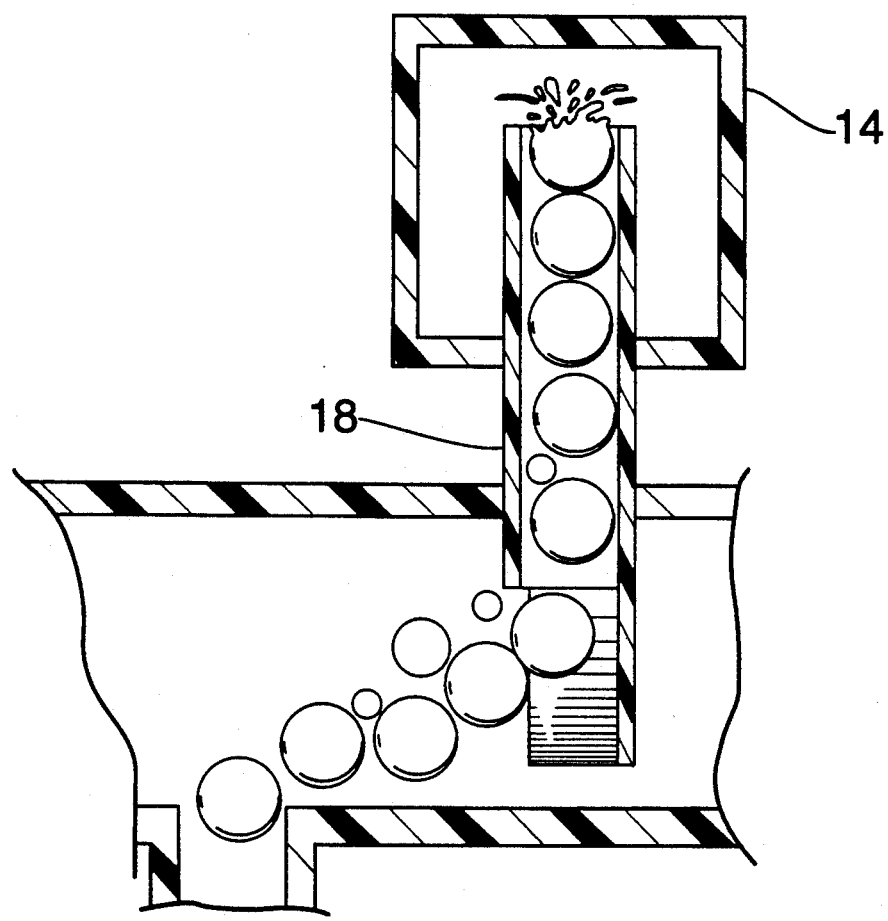
FIG. 3—A cross-sectional view of a protein skimmer for use with the subject wet/dry filtration system.
Figure 4A:
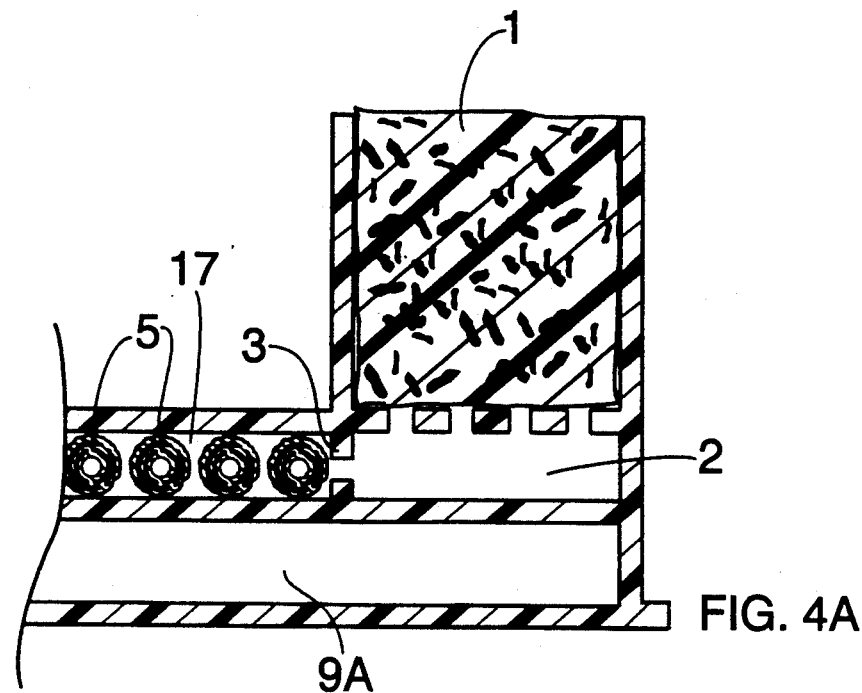
FIG. 4A—A cross-sectional view taken along line A—A in FIG. 2.
Figure 4B:
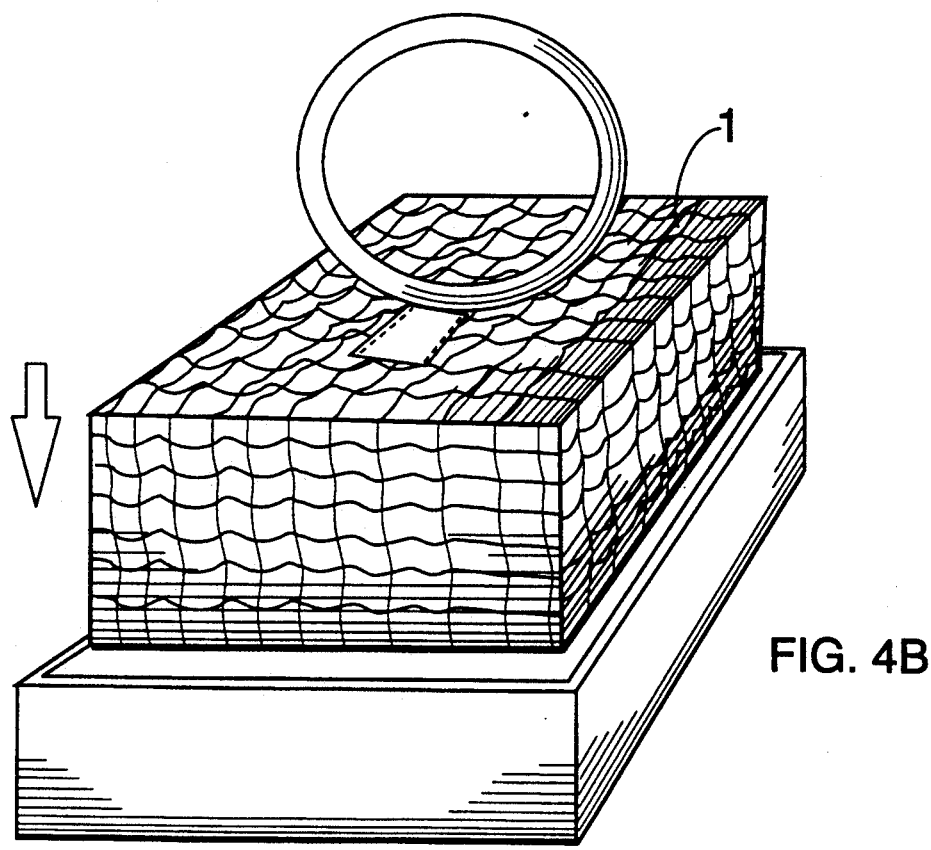
FIG. 4B—An exploded prospective view of the sponge insert depicted in FIG. 4A, together with a drip plate which holds the sponge.

Referring to FIGS. 1, and 2, water from the aquarium enters the filter through the sponge 1 and passes into chamber 2 where it passes through the drip plate 3 into biological/oxygen reactor chamber 17. Air is injected through an air supply tube 4 into chamber 17 at a point proximate to the drip plate 3. The water then trickles over the biological supports 5 which are held in place by stop 6. Water exiting the chamber 17 falls through opening 7 at the end of plate 8 into sump 9 where it enters airlift tube 10 and is lifted upward by bubbles from airstone 12 into return fitting 13. In a marine aquarium, proteinaceous material enters skimmer uplift tube 18 and collects in skimmer cup 14 (see FIG. 3). Water exiting the return fitting 13 passes through absorption chemical adapter 15 and then transverses additive chemical adapter 16, thus returning to the aquarium.

Air injected through air supply tube 4 builds up in chamber 17 and eventually passes through opening 7 and around plate 8 into the lower sump chamber 9A where it collects. Eventually, a pool of air develops and enters the upper sump chamber 9B (water in this chamber remains at the bottom since it is displace by the air). When the air pressure in the upper sump chamber 9B rises to a pre-established level, it enters the air relief risers 18 and exits into the open air above the water level (alternatively, the air relief riser can be removed allowing the air to bubble out of the air relief port 18 where it then rises against the back wall of the tank until the bubbles burst at the surface).

The filter intake is located at the level of the gravel, i.e., the entire filter housing except the intake is buried in the gravel. To aid in anchoring the filter and to ensure that the gravel opaques the housing, a flange 19 surrounds the lower perimeter of the housing. Gravel placed on top of flange 19 renders the housing invisible when viewed through the aquarium glass at a point below gravel level. Additionally, to further assist in stabilizing the filter, especially in commercial establishments where gravel is not used, one or more suction cups 20 may be attached to the filter. FIG. 1 illustrates the use of a suction cup on the return fitting 13 to affix it to the aquarium glass.

Surface particles, such as food or fish feces, fall to the bottom of the tank and are sucked into the filter. Preferably, the filter intake is located at the rear of the tank so that it slowly draws debris across the bottom surface of the tank together with the water. Thus, the vast majority of sinking matter is drawn into the particle filter of the purification system. Particulates decomposing on the filter will have their putrilage (in the context of this patent application, putrilage is to include both biologically decomposed and physically broken down materials capable of passing through the sponge) drawn through the sponge and into the biologically reactive chamber. Putrilage that assists the health and growth of the bacteria bed is degraded, processed and absorbed by the bacteria. Remaining putrilage is removed by oxidation in the oxygen reactor/biological chamber and noxious decomposition products are absorbed by the carbon filter adapter on the end of the uplift tubes. In marine applications, protein skimmers remove all materials that an be removed by foam fractionation, including coloring agents in the water, to yield crystal clear water.

Upon reading the subject application various embodiments will become obvious to those skilled in the art. These variations are to be considered within the scope and spirit of the subject invention. Moreover, the examples and text set forth above are to be considered as representative of the subject invention, but are not to be construed as limiting. The subject application is only to be limited by the claims which follow and their equivalents.

What is claimed is:

1. A wet/dry filtration system for use with an aquarium, which comprises:
   (a) a housing having a water input opening and a water output opening;
   (b) a particulate filter contained within the housing proximate to the input opening and having one side in communication with the input opening and a second side in communication with the interior of the housing;
   (c) a first chamber located below the particulate filter to collect water passing through the particulate filter;
   (d) a second chamber coupled to the first chamber via a drip plate, the drip plate configured so that water traversing the drip plate from the first chamber enters the second chamber, the second chamber having a plurality of bio balls located therein;
   (e) means for introducing a flow of oxygen through the second chamber, the oxygen being introduced in amounts sufficient to produce a wet/dry environment for sustaining a bacteria bed within the chamber;
   (f) a sump located below the second chamber for collecting the water and oxygen which exit the second chamber;
   (g) a tube for discharging oxygen from the top of the sump; and
   (h) means for generating a flow of water through the system by removing water from the bottom of the sump.

2. A wet/dry filtration system of claim 1, wherein the housing is made of a plastic.

3. A wet/dry filtration system of claim 1, wherein the particulate filter comprises a sponge.

4. A wet/dry filtration system of claim 3, wherein the sponge is enclosed within a porous material.

5. A wet/dry filtration system of claim 4, wherein the porous material is a netting.

6. A wet/dry filtration system of claim 5, wherein the netting further comprises means for facilitating removal of the sponge.

7. A wet/dry filtration system of claim 6, wherein the means for facilitating removal of the sponge comprise a loop.

8. A wet/dry filtration system of claim 1, wherein the means for introducing oxygen through the second chamber comprises a tube.

9. A wet/dry filtration system of claim 8, wherein the tube enters the second chamber at the end at a point proximate to the drip plate.

10. A wet/dry filtration system of claim 9, wherein the end of the tube opposite the end entering the second chamber is connected to a source of pressurized oxygen containing gas.

11. A wet/dry filtration system of claim 10, wherein the source of pressurized oxygen containing gas is an air pump.

12. A wet/dry filtration system of claim 1, wherein the means for inducing a flow of water through the system comprises a gas lift tube.

13. A wet/dry filtration system of claim 12, wherein the gas lift tube is sealingly connected through the water output opening with its lower end proximate to the bottom of the sump.

14. A wet/dry filtration system of claim 13, wherein the gas lift tube comprises means for introducing a gas to a position below the water line in the aquarium so that the force of the gas bubbling through the water causes a flow of water from the bottom of the sump through the water output opening via the gas lift tube and into the aquarium.

15. A wet/dry filtration system of claim 13, wherein the gaslift tube further comprises a fitting at the end opposite the connection to the water output opening for returning water to the aquarium.

16. A wet/dry filtration system of claim 15 further comprising a protein skimmer.

17. A wet/dry filtration system of claim 16, wherein the protein skimmer comprises a tube that contacts the water in the fitting under conditions such that bubbles present in the fitting rise through the tube and burst within a container enclosing the top of the tube thereby depositing proteinaceous material within the container.

* * * * *